United States Patent

Bath

[15] 3,641,491
[45] Feb. 8, 1972

[54] AUTOMATIC ANTICOLLISION AND ACCIDENT MARKER SYSTEM FOR AUTOMOTIVE VEHICLE

[72] Inventor: James Reynolds Bath, Drawer 60337, Houston, Tex. 77060

[22] Filed: June 10, 1968

[21] Appl. No.: 735,776

[52] U.S. Cl. ...................340/61, 340/52 H, 340/105, 340/115, 317/154
[51] Int. Cl. .........................................B60q 1/00
[58] Field of Search ...................340/52, 61, 105, 115, 52 H, 340/65, 64, 366; 315/76

[56] References Cited

UNITED STATES PATENTS

| | | | |
|---|---|---|---|
| 1,921,290 | 8/1933 | Gragg et al. | 340/115 |
| 2,113,919 | 4/1938 | Korematsu | 340/105 |
| 3,024,386 | 3/1962 | Chauvineau | 340/105 |
| 3,434,106 | 3/1969 | Lawless | 340/61 |
| 1,085,608 | 2/1914 | Heath | 180/104 |
| 1,568,509 | 1/1926 | Kolling | 340/64 |
| 2,982,944 | 5/1961 | Weller | 340/52 |
| 2,984,820 | 5/1961 | Kennell | 340/331 |
| 3,022,392 | 2/1962 | Clemson | 340/52 H |
| 3,295,101 | 12/1966 | Ellis | 340/54 |
| 3,428,941 | 2/1969 | Hewes | 340/66 |

*Primary Examiner*—John W. Caldwell
*Assistant Examiner*—Robert J. Mooney
*Attorney*—Rose & Edell

[57] ABSTRACT

An impact switch mounted on a vehicle controls high-intensity condenser discharge lights (hereinafter called strobe lights) also mounted on the vehicle. The strobe lights may be turned on in response to operation of an impact switch, through circuit interruption, or manually at will. Strobe lights emit light having a spectrum which is largely in the blue, which is readily visible in rain and fog, and peak intensity of light emission is at least 10 times greater than that of a standard beam.

4 Claims, 3 Drawing Figures

PATENTED FEB 8 1972                         3,641,491

INVENTOR
JAMES REYNOLDS BATH

BY *Hurvitz, Rose & Greene*

ATTORNEYS

AUTOMATIC ANTICOLLISION AND ACCIDENT MARKER SYSTEM FOR AUTOMOTIVE VEHICLE

BACKGROUND OF THE INVENTION

In 1966 deaths due to motor vehicle accidents totaled 53,000, injuries totaled 1,900,000 and costs exceeded $10,000,000,000. The victims were mostly occupants of motor vehicles, and over half the accidents occurred at night. A great many of these accidents occurred by virtue of secondary collisions, i.e., collisions with cars which are stationary at the time of the secondary collision because they have had a primary collision. Particularly on turnpikes, and other high-speed roads, is this true. Many deaths could be avoided if automatic signals could be given to oncoming motorists of the location of a collision or of the presence of a nonmoving vehicle on a road, regardless of why that vehicle is nonmoving. Typical reasons are 1. engine failure
2. out of gas
3. tire failure
4. driver illness
5. collision. Where a secondary collision, or a primary collision with a stationary vehicle occurs one usually finds conditions of poor visibility, i.e., they occur most frequently at night and especially in conditions of rain, or fog at night. The colliding vehicle is usually moving rapidly and does not see the stationary vehicle in time to avoid collision. The problem is then not merely to provide warning, but to provide a sufficiently early warning to enable avoidance of a collision.

In addition, many deaths occur because vehicles leave the road in such circumstances that they cannot be readily seen from the road. People may then be trapped within or under the vehicle, injured, but cannot reasonably expect assistance. Installations of devices according to the present invention, on the vehicle, would activate automatically and attract attention from a considerable distance and thus result in the dispatch of assistance and the saving of life.

These results cannot be accomplished by ordinary incandescent lamps. Their defects involve poor spectral emissivity and low light intensity, and the latter especially is not susceptible of correction.

The solution to the problem is the use of strobe lights, which produce high-intensity light pulses. Strobe lights operate in response to rapid discharge of a condenser which was rather slowly charged. They produce high-energy light flashes of very brief durations, well spaced in time. Flash rates may be 50 per minute, and such lights contain no filaments which might rupture in a collision. They are capable of producing light visible for several miles in a light haze, and under any given circumstances are about 10 times brighter than a standard rotating beacon, such as are commonly used on police vehicles.

The use of a pulsed light, available as a protective device in case of collision, has another function. Its inertial switch can be set to operate on very rapid deceleration, as well as on collision, and therefore collision between a very rapidly decelerated and a following moving vehicle can be avoided. Because the strobe light is pulsing, it does not impede or affect the normal lighting of the vehicle.

SUMMARY OF THE INVENTION

A high-intensity pulsing light mounted exteriorly on a vehicle to provide an automatically activated emergency warning system, and operative on extremely rapid deceleration or collision, or at will.

DESCRIPTION OF THE PREFERRED EMBODIMENTS

Figure 1:
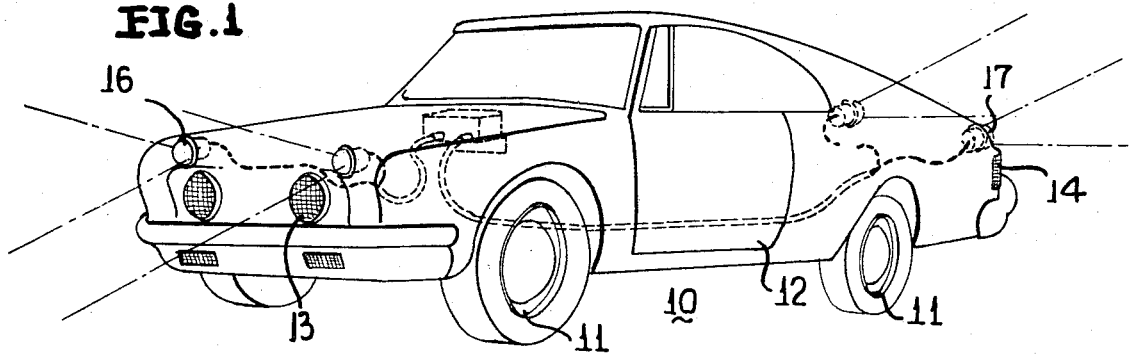
FIG. 1 is a view in perspective of a motor vehicle having standard lighting and also provided with strobe lights.

In FIG. 1, 10 is an automotive vehicle of conventional type, having four wheels 11, a body 12, headlamps 13 and rear lamps 14, which normally include low-intensity lamps for brake-on indicators.

On the vehicle 10 at its forward part, at points of maximum available elevation, are located strobe lights 16. Similar lights 17 are provided at the rear of the vehicle. The strobe lights are not normally in use.

Figure 2:
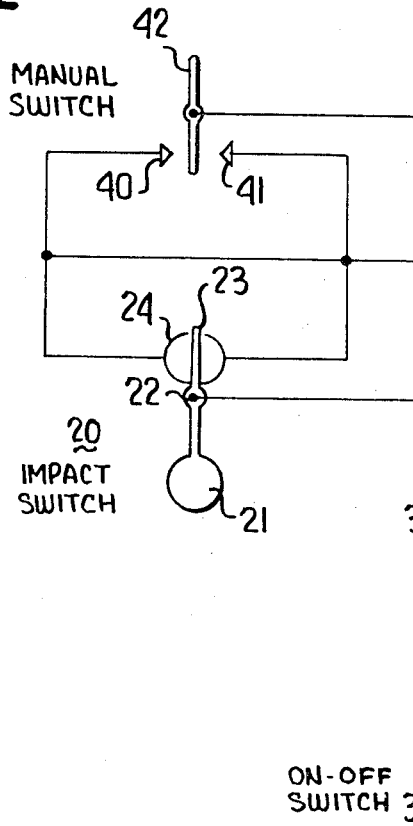
FIG. 2 is a schematic circuit diagram of a strobe light operating system for a vehicle, the system being operative in response to predetermined deceleration of the vehicle, due to either collision or impact, and being operative by a transient manipulation of a manual switch.

In FIG. 2 of the drawings is illustrated strobe lights 16 and 17. A deceleration responsive switch 20 is mounted in the vehicle. Switch 20 comprises a weight 21, pivoted about and hanging below point 22. A switch arm 23 is secured to weight 21, swinging with the latter. A circumferential stationary contact 24 is located about switch arm 23, on the longitudinal axes of the vehicle. The switch 20 then closes at least momentarily, on very rapid deceleration or on impact, regardless of the direction in which this occurs.

On closure of switch 20, a circuit is closed to a lock relay 27, the circuit extending from 12-V. line 30, to contact 24, arm 23, line 31, and back to ground via line 32 and on-off switch 33. The lock relay 27, when transiently energized, locks itself on through contacts 34 and closes contacts 35. These energize front strobe lights 16 and rear strobe lights 17, directly from line 30. These latter therefore remain on and flashing, until turned off by opening the circuit of locking relay 17, by means of switch 33.

Connected in parallel with contact 24 are further spaced contacts 40, 41, between which is located a movable switch arm 42. Arm 42 is manually movable to close a circuit from line 30 through either contact 40 or 41, when the manual switch is closed, and via line 43 to line 31. It follows that transient movement of either switch arm 42 or 23 will energize strobe lamps 16, 17, if switch 33 is closed, until the latter is opened.

In operation, on starting to drive, on-off switch is closed. The strobe lights 16, 17, nevertheless remain unenergized. Should the driver judge for any reason that driving conditions are dangerous, he may transiently operate switch arm 42 and start the strobes. Should the vehicle collide with another vehicle or a stationary obstacle, or roll over, or otherwise be subject to rapid deceleration in any direction, switch 20 will close.

The strobe lights 16, 17 operate continuously, once started, flashing with very high intensity about once a second. Thereby the consequences of any accident or near accident, in terms of a pileup, are minimized. At the same time the strobes can be manually turned on at will, if driving conditions become dangerous, such as approaching an accident site where a warning should be passed to traffic behind.

The net effect of the availability of strobe lights on all cars is to reduce deaths and serious accidents, because of their unique characteristics, i.e., they flash, their spectral distribution is favorable, and their intensity is at least 10 times that of an incandescent lamp. They do not employ filaments and hence are likely to withstand extreme shock. Since one lamp is employed at each corner of the vehicle 10, at least one lamp will be visible even if the vehicle overturns, and it is unlikely that all the lamps will be disabled by a collision.

Figure 3:
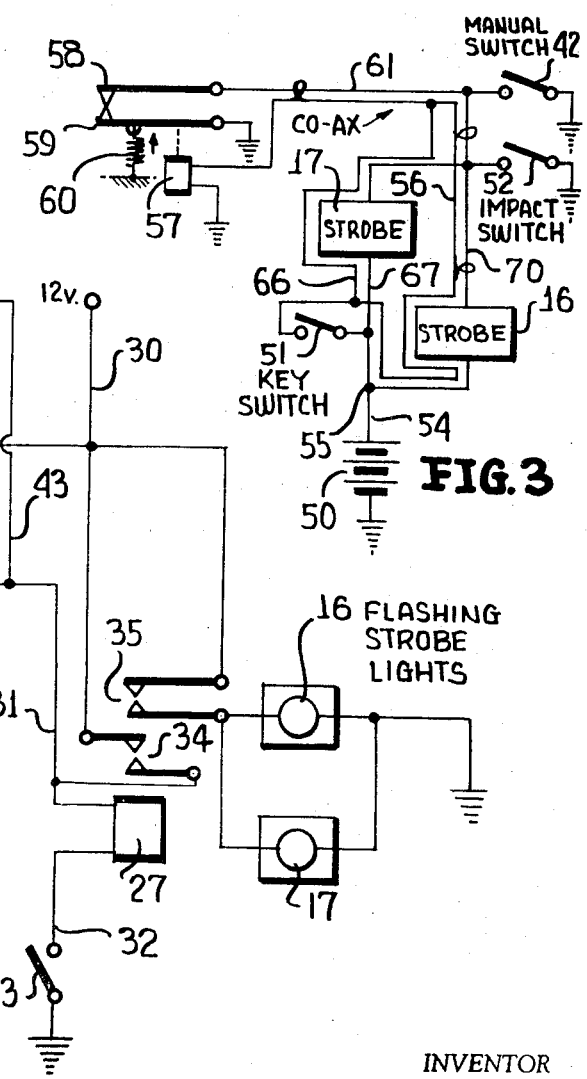
FIG. 3 is a modification of the system of FIG. 2, including fail-safe provisions.

Referring now to FIG. 3 of the accompanying drawings, vehicle battery 50 has one terminal grounded and its other terminal connected to one side of a key switch 51 (which may be an ignition switch) and to one side of strobe lamps 16, 17, these being the same strobe lamps as shown in FIG. 1. The other connection to the strobe lamps is to ground via a manual switch 42 and via an impact switch 52. A lead 56 proceeds from the other side of key switch 51 to a relay 57. The latter is normally closed at contacts 58, 59, being spring-biased closed by spring 60. The relay 57, when energized, pulls down the contact 59 and opens the switch. Therefore, so long as both of switches 42, 52 are open and key switch 51 is closed, strobes 16, 17 are not energized. But, if the leads 56 open, the relay 57 will be deenergized, contacts 58, 59 will close, and a circuit for the strobes will be available via line 70, line 61, contacts 58, 59 to ground.

The line 56 is assumed coaxial with lead 70 and exterior thereof. If now an impact created a break in leads 56, 70, strobe 16 would be disabled, relay 57 would be at least in part deenergized, contacts 58, 59 would close, and a power circuit would be available for strobes 17, via lead 61, 67. This circuit would operate even if switches 42, 52 were disabled in open condition, or did not operate for any reason. More specifically, in the absence of a break in the leads 56, 70, the relay 57 is energized by a parallel circuit path comprising leads 66 and 56. The combined resistance of these leads is sufficiently low to permit the driving current supplied by battery 50 to energize relay 57 to pull contact 59 away from contact 58. Under such circumstances, and assuming neither of switches 42 and 52 to be actuated, there is no ground path for the strobe line circuits. If a break occurs in the line comprising leads 56, 70, lead 56 is no longer in circuit between the battery and relay 57, leaving only line 66 and its resistance in circuit with the battery and relay. The relay thus deenergizes, the relay contacts close, and strobe 17 is actuated.

In essence plural strobes are connected in circuit simultaneously, and all are required to remain in circuit if relay 57 is to maintain contacts 58, 59 open. In any strobe is disabled, as because its lines are cut in a collision, relay 57 will have its current pro tanto reduced, say by even 20 percent, and will then permit contacts 58, 59 to close and thereby will energize all strobes not disabled in the collision. Reliance is not then placed entirely on impact switch 52.

What I claim is:

1. In an automotive vehicle:
a source of supply voltage;
an emergency device, actuable in response to current flow therethrough;
a normally open deceleration switch responsive to said vehicle experiencing a predetermined forward deceleration and additionally responsive to said vehicle experiencing a predetermined rearward deceleration for completing a first current path for said supply voltage through said emergency device;
a bistable element having first and second stable states;
first means responsive to said bistable element in said first stable state for providing an alternative current path for said supply voltage through said emergency device, and responsive to said bistable element in said second stable state for interrupting said alternative current path; and circuit means for normally maintaining said bistable element in said second stable state and responsive to breakage of at least one current lead in said first current path for switching said bistable element to said first stable state, said circuit means including a further current lead connected between said source and said bistable element.

2. The combination according to claim 1 wherein said emergency device includes at least two condenser-discharge lights mounted on said vehicle.

3. In an automotive vehicle:
a source of supply voltage;
at least first and second condenser-discharge lamps mounted on the exterior of said vehicle, each lamp being responsive to current flow therethrough to flash on and off repetitively;
a normally open impact switch actuable in response to said vehicle experiencing a sudden force above a preestablished force;
first circuit means interconnecting said impact switch and said lamps to permit current flow through both of said lamps in response to actuation of said impact switch, said first circuit means including a first current lead connecting said first lamp in series with said source and said impact switch, and a second current lead connecting said second lamp in series with said source and said impact switch;
a relay including a coil and normally closed contacts, said relay being responsive to current flow above a predetermined level through said coil for opening said normally closed contacts;
second circuit means for connecting said normally closed contacts in parallel with said impact switch;
third circuit means including a third current lead disposed coaxially with said first current lead, and a fourth current lead disposed coaxially with said second current lead, said third and fourth leads being connected in parallel between said source and said relay coil, the combined parallel resistance of said third and fourth current leads being sufficiently low to permit current above said predetermined level to flow through said source and said relay coil, the individual resistances of said third and fourth current leads being sufficiently high to cause current below said predetermined level to flow through said source and relay coil when one of said third and fourth leads is broken.

4. A combination according to claim 3 further comprising a manually actuable switch connected in parallel with said impact switch.

* * * * *